3,341,836
LIQUID LEVEL DETECTOR
Charles R. Marcum, Jeffersontown, Ky., assignor to General Equipment & Mfg. Co., Louisville, Ky., a corporation of Kentucky
Filed Aug. 6, 1964, Ser. No. 387,831
2 Claims. (Cl. 340—244)

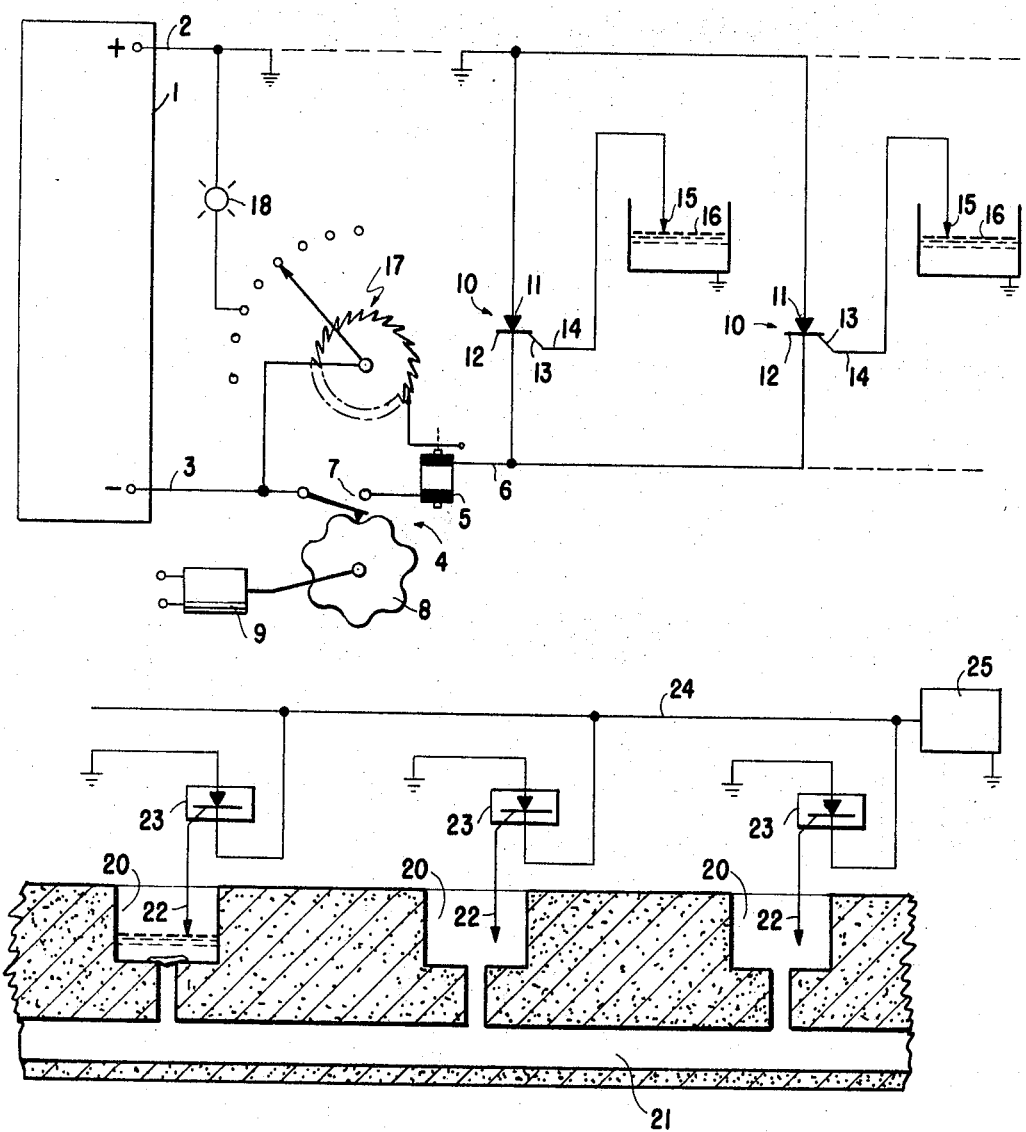

This invention relates to detecting and signaling equipment and in particular to improved, inexpensive means for monitoring the liquid level of a liquid or liquids at one or more locations.

Various methods are employed for monitoring liquid levels. These include float operated devices, and, where the liquid is electrically conductive, electrical signal circuits that are completed through the liquid. The float operated devices are subject to sticking, mechanical damage to the float, and require substantial mounting equipment. The electrical conductivity systems require extensive equipment to respond to the current through the liquid since the current flow may vary over extremely wide ranges depending upon the conductivity of the liquid.

The principal object of this invention is to provide a simple, inexpensive, reliable system for monitoring the level of liquid at one or more stations.

Another object of this invention is to provide a simple, inexpensive liquid level monitoring system having a delayed response.

A still further object is to provide a liquid level monitoring system that responds to an excess liquid level existing at any of a plurality of stations during any part of a predetermined time interval.

These and more specific objects and advantages are provided by a liquid level monitoring system constructed according to the invention.

According to the invention, the liquid level at one or more stations is sensed by probes adapted to be contacted by the liquid, which probes when contacted trigger semiconductor controlled rectifiers to close a signal circuit. The signal circuit or power lead circuit is periodically opened to reset the rectifiers. Closure of the power circuit during each of a predetermined number of cycles, consecutive or not, actuates an indicating or alarm circuit.

The improved circuit is of particular advantage where a number of isolated stations must be monitored, since only a single lead is required, the circuit being returned through the ground. If the liquid to be sensed is in an insulating container, a ground lead to the liquid is required.

The improved circuit is particularly useful in montoring drainage systems such as storm or sanitary sewers. In this use the monitoring system is pulsed or energized a few times per second or per minute depending upon the desired speed of response. If an excess liquid level is sensed at any station during a pulse a stepping switch is advanced one step. After a predetermined number of steps an alarm circuit may be actuated. If desired, the stepping switch may be reset periodically.

The improved monitoring system is illustrated in the accompanying drawings.

In the drawings:
FIGURE 1 is a schematic wiring diagram of the improved monitoring system.
FIGURE 2 is a generally schematic diagram illustrating one use of the monitoring system.

The improved monitoring system, as shown in FIGURE 1, comprises a source of direct current that provides a voltage in the order of 50 volts between leads 2 and 3, the lead 2 being positive with respect to lead 3. Lead 2 is preferably grounded and provides a reference potential. Lead 3 is connected through a motor driven interrupter 4 and a stepping switch coil 5 to a signal or power lead 6. The interrupter 4 includes a switch 7, which preferably is a mercury switch to ensure long life, that is periodically operated by a cam 8 driven by a motor 9. Any type of interrupter capable of periodically opening the circuit from the lead 3 to the power lead 6 may be substituted for the interrupter shown.

A semi-conductor controlled rectifier such as a silicon controlled rectifier 10 is provided at each station at which liquid level is to be sensed. Each rectifier has its anode 11 connected to ground or to an extension of the lead 2 and its cathode 12 connected directly to the power signal lead 6. A gate or control electrode 13 of each rectifier 10 is connected through a lead 14 to a probe 15 adapted to contact a liquid 16 at the level to be monitored. The body of liquid must be grounded or electrically connected to the lead 2 so that it is at the reference potential.

When the switch 7 closes the lead 6 is driven negative according to the voltage of the supply 1. As the cathode 12, connected to lead 6, goes negative the leakage current from the gate electrode 14 to the cathode 12 maintains the probe potential equal or slightly positive with respect to the cathode 12.

If the probe is in contact with the liquid 16 at ground potential additional current flows from the gate to cathode in an amount sufficient to trigger the rectifier into conduction. During conduction the cathode 12 is at substantially the same potential as the anode 11 and full voltage is applied to the coil 5 of a stepping switch 17. The switch thereupon steps to its next position or is conditioned to step when the voltage is removed depending upon whether the solenoid 5 acts directly on the pawl of the ratchet gear of the switch or whether the pawl engages the ratchet gear on its spring driven return stroke.

The rectifier continues to conduct until the power to the lead 6 is cut off at the interrupter 7. Discontinuing the current flow restores the rectifier to its non-conducting state. As long as the liquid level at any station is above the detection level, the rectifier at that station becomes conducting each time the switch 7 closes.

The stepping switch 17 may be arranged to complete a circuit through an indicator lamp or alarm 18 whenever excess liquid level is detected at one or more stations during each of a predetermined number of cycles of the interrupter 4. If desired, the indicator 18 may be arranged to lock in, like an annunciator for example, to maintain the indication until manually reset.

Because of its extreme simplicity and reliability this detection system may be economically feasible in many locations where an indication is desirable but not worth the cost of more complex systems. One such example is detection of clogged sewers of a municipal sewer system. Such a system is schematically illustrated in FIGURE 2. In such a system a plurality of catch basins 20 connected into a drain 21 are each provided with a probe 22 (corresponding to the probe 15) that extends nearly to the bottom of the catch basin. The probe is insulated from ground. The corresponding controlled rectifier is sealed into a small housing 23 mounted on the upper end of the probe. The housing is electrically insulated from the probe and grounded while the cathode lead of the rectifier is brought out for connection to a power lead 24 (corresponding to the power lead 6).

The power supply, interrupter, and indicator mechanism is preferably located at a central station 25.

If a number of series of detection stations are required the interrupter 4 may be replaced with a motor driven tap switch, each tap of which energizes a separate stepping relay and series of rectifiers in a series of stations.

Various modifications may be made in the specific apparatus without departing from the scope of the invention.

Having described the invention, I claim:

1. A detector for detecting the level of a substance exhibiting some degree of electrical conductivity comprising, in combination, a first potential, conductive means establishing said potential as a reference potential corresponding to the potential of said substance to be detected, a second potential negative with respect to said first potential, a power lead, means for periodically energizing said power lead at said second potential, at least one semiconductor controlled rectifier having its anode connected to said first conductive means and its cathode connected to said power lead, a detector probe, said rectifier having a control electrode connected to said probe, current detecting means connected in series with said power lead and said cathode, and counting means connected to said detecting means to produce an output signal in response to a predetermined number of current pulses through said current detecting means.

2. A detector for detecting the level of a substance exhibiting some degree of electrical conductivity comprising, in combination, a first potential, conductive means establishing said potential as a reference potential corresponding to the potential of said substance to be detected, a second potential negative with respect to said first potential, a power lead, means for periodically energizing the power lead at said second potential, at least one semiconductor controlled rectifier having an anode connected to said first conductive means and a cathode connected to said power lead, a conductive probe adapted to contact the substance at the level to be detected, said rectifier having a control electrode connected to said probe, a stepping switch having an operating coil connected in series with the power lead and said cathode, and an indicator circuit connected to preselected contacts of the stepping switch.

References Cited

UNITED STATES PATENTS

| | | | |
|---|---|---|---|
| 3,171,112 | 2/1965 | Martin | 340—253 |
| 3,189,759 | 6/1965 | Laishley | 307—88.5 |
| 3,206,615 | 9/1965 | La Pointe. | |
| 3,218,470 | 11/1965 | Padgett et al. | 307—88.5 |

NEIL C. READ, *Primary Examiner.*

D. MYER, *Assistant Examiner.*